United States Patent
Tay et al.

(10) Patent No.: US 9,698,871 B2
(45) Date of Patent: Jul. 4, 2017

(54) NEAR FIELD COMMUNICATIONS APPARATUS

(75) Inventors: Zern Tay, Cambridge (GB); Shyam Patel, Cambridge (GB); Anthony McFarthing, Ely (GB)

(73) Assignee: QUALCOMM TECHNOLOGIES INTERNATIONAL, LTD., San Diego, CA (US)

( * ) Notice: Subject to any disclaimer, the term of this patent is extended or adjusted under 35 U.S.C. 154(b) by 424 days.

(21) Appl. No.: 13/546,343

(22) Filed: Jul. 11, 2012

(65) Prior Publication Data

US 2013/0017782 A1    Jan. 17, 2013

(30) Foreign Application Priority Data

Jul. 11, 2011    (GB) .................................... 1111857.7

(51) Int. Cl.
*H04B 5/02* (2006.01)
*H04B 5/00* (2006.01)
*G06K 7/10* (2006.01)

(52) U.S. Cl.
CPC ....... *H04B 5/0025* (2013.01); *G06K 7/10237* (2013.01); *H04B 5/0012* (2013.01)

(58) Field of Classification Search
USPC ....................................................... 455/41.1
See application file for complete search history.

(56) References Cited

U.S. PATENT DOCUMENTS

| 5,227,798 | A | * | 7/1993 | Hildebrand ...................... 342/51 |
| 6,150,921 | A | * | 11/2000 | Werb et al. ................... 340/10.1 |
| 7,183,994 | B2 | | 2/2007 | Weigand |
| 7,526,266 | B2 | | 4/2009 | Al-Mahdawi |
| 8,233,872 | B2 | | 7/2012 | Nagai et al. |
| 8,285,214 | B2 | | 10/2012 | Sadeghfam et al. |
| 8,351,850 | B2 | | 1/2013 | Van Aken et al. |
| 8,363,086 | B1 | * | 1/2013 | Shah .......................... 348/14.02 |
| 8,437,696 | B2 | * | 5/2013 | Audic .......................... 455/41.1 |
| 8,606,212 | B2 | | 12/2013 | Sheikholeslami |
| 8,626,135 | B1 | * | 1/2014 | Schilit et al. .............. 455/414.1 |
| 2003/0054788 | A1 | | 3/2003 | Sugar et al. |
| 2004/0196037 | A1 | * | 10/2004 | Xiang et al. ................... 324/300 |
| 2005/0096000 | A1 | | 5/2005 | Petrovic et al. |
| 2005/0111846 | A1 | * | 5/2005 | Steinbacher et al. .......... 398/140 |
| 2005/0151645 | A1 | * | 7/2005 | Meskens et al. ............. 340/552 |
| 2006/0025897 | A1 | * | 2/2006 | Shostak et al. .................... 701/1 |

(Continued)

FOREIGN PATENT DOCUMENTS

DE    102012012099 A1    12/2012
DE    102012013632 A1    1/2013

(Continued)

OTHER PUBLICATIONS

United Kingdom Intellectual Property Office Search Report for Application No. GB1111857.7 dated Nov. 2, 2012.

(Continued)

*Primary Examiner* — Ney Maung
*Assistant Examiner* — Erica Fleming-Hall
(74) *Attorney, Agent, or Firm* — Paradice and Li LLP (57) ABSTRACT

A near field communications apparatus comprising a signal source, a transmit antenna and means for detecting a change in the input impedance of the transmit antenna to detect the presence of a device which is compatible with the apparatus.

16 Claims, 4 Drawing Sheets

(56) References Cited

U.S. PATENT DOCUMENTS

| | | |
|---|---|---|
| 2006/0098765 A1 | 5/2006 | Thomas et al. |
| 2006/0158165 A1 | 7/2006 | Inn et al. |
| 2006/0170553 A1* | 8/2006 | Bierach ............... 340/572.4 |
| 2007/0046433 A1* | 3/2007 | Mukherjee ......... G06K 19/0672 340/10.1 |
| 2007/0120562 A1* | 5/2007 | Navsariwala .......... G01N 22/00 324/239 |
| 2008/0018327 A1 | 1/2008 | Reynolds |
| 2009/0009293 A1* | 1/2009 | Drucker ................. 340/10.1 |
| 2009/0075591 A1 | 3/2009 | Murdoch et al. |
| 2009/0079524 A1* | 3/2009 | Cyr et al. ............... 334/78 |
| 2009/0253385 A1* | 10/2009 | Dent et al. ............... 455/83 |
| 2009/0278685 A1* | 11/2009 | Potyrailo et al. ......... 340/572.1 |
| 2009/0295344 A1 | 12/2009 | Qu |
| 2010/0002803 A1 | 1/2010 | Murdoch et al. |
| 2010/0015917 A1* | 1/2010 | Symons et al. ............. 455/41.1 |
| 2010/0054350 A1 | 3/2010 | Kojima |
| 2010/0141435 A1* | 6/2010 | Breed ................... 340/539.13 |
| 2010/0271188 A1* | 10/2010 | Nysen ................... 340/10.41 |
| 2010/0304684 A1 | 12/2010 | Duron et al. |
| 2011/0051868 A1* | 3/2011 | Roufoogaran et al. ....... 375/350 |
| 2011/0109442 A1* | 5/2011 | Pavlov et al. ............. 340/10.4 |
| 2011/0187509 A1* | 8/2011 | Raptis et al. ............. 340/10.3 |
| 2011/0299635 A1* | 12/2011 | Mirzaei et al. ............. 375/340 |
| 2012/0105029 A1 | 5/2012 | Kawagoe |
| 2012/0126973 A1* | 5/2012 | DeAngelis et al. ..... 340/539.13 |
| 2012/0127021 A1* | 5/2012 | Gravelle ................ G01S 7/023 342/130 |
| 2012/0231734 A1* | 9/2012 | Symons et al. ............. 455/41.1 |
| 2012/0322399 A1 | 12/2012 | Sheikholeslami |
| 2013/0003892 A1 | 1/2013 | McFarthing |
| 2013/0021012 A1 | 1/2013 | Oddoart et al. |
| 2014/0287698 A1* | 9/2014 | Ali ........................ H03H 7/40 455/77 |

FOREIGN PATENT DOCUMENTS

| | | |
|---|---|---|
| DE | 102012013120 A1 | 3/2013 |
| EP | 0515187 A3 | 11/1992 |
| EP | 2221984 A1 | 8/2010 |
| GB | 2428940 A | 2/2007 |
| GB | 2484103 A | 4/2012 |
| GB | 2491883 A | 12/2012 |
| GB | 2492362 A | 1/2013 |
| GB | 2493000 A | 1/2013 |
| GB | 2497775 A | 1/2013 |
| WO | WO 2006/076669 A1 | 7/2006 |
| WO | WO 2006/088583 A2 | 8/2006 |
| WO | WO 2009/128032 A1 | 10/2009 |
| WO | WO 2010/041173 A1 | 4/2010 |

OTHER PUBLICATIONS

United Kingdom Intellectual Property Office Combined Search and Examination Report for Application No. GB1111857.7 dated Nov. 5, 2012.

Finkenzeller K: "RFID Handbuch", 5th edition, Munich, Carl Hanser Verlag, 2008, pp. 31-35, Chap. 3 to 3.1.1—ISBN 978-3-446-41200-2.

* cited by examiner

NEAR FIELD COMMUNICATIONS APPARATUS

CROSS REFERENCE TO RELATED APPLICATION

This application claims priority under 35 U.S.C. §119 of United Kingdom Application No. GB1111857.7, titled "NEAR FIELD COMMUNICATIONS APPARATUS," filed Jul. 11, 2011, and incorporated herein by reference in its entirety.

TECHNICAL FIELD

The present invention relates to a near field communications (NFC) apparatus, and to a method for detecting a near field communications device.

BACKGROUND TO THE INVENTION

Near field communications (NFC) devices are becoming increasingly popular, in sectors such as banking, as they permit rapid exchange of data over a short range (less than 10 cm), which can be used to facilitate making small value payments, for example.

In recent times interest in incorporating active NFC devices such as NFC readers in small portable devices such as mobile telephones has grown. Whilst this is possible, it is at present impractical due to the current required for an active NFC reader to identify a compatible NFC device and to perform an NFC data transaction.

At present in order to perform an NFC transaction an active NFC device such as an NFC reader must generate a magnetic field with which DC power can be delivered to a receiving NFC device, which may be a passive NFC device such as a tag. The current required to generate such a magnetic field around an antenna of the active NFC device may be as high as 100-200 mA, and this type of operation, which is known as Reader Emulation Mode (REM), may need to be continued for an extended period of time in a search mode in which the active NFC device tries to identify a compatible NFC device with which to perform a data transaction.

When REM is used by an active NFC device such as a reader to search for compatible NFC devices, a signal modulated with data is transmitted by the reader, which awaits a reply. When a reply is received, a data transaction can take place between the active reader and the replying device. It will be appreciated that this process of searching for compatible devices can occupy a high proportion of the operating time of the NFC device and thus consumes a considerable amount of power, making it unsuitable for use in portable devices such as mobile telephones which have limited battery resources.

Accordingly, there is a need for a low power mode of operation for an active NFC device which is suitable for use in portable devices such as mobile telephones.

SUMMARY OF INVENTION

According to a first aspect of the present invention there is provided a near field communications apparatus comprising a signal source, a transmit antenna and means for detecting a change in the input impedance of the transmit antenna to detect the presence of a device which is compatible with the apparatus.

In the apparatus of the present invention, the NFC apparatus is able to transmit periodically a low-power signal to detect the presence of a compatible NFC device. If a compatible device is detected the apparatus is able to switch into REM mode to complete a data transaction with the compatible device. Thus, the apparatus of the present invention need not operate in the inefficient REM search mode, thereby reducing power consumption.

The signal source may be configured to generate a signal at a constant frequency.

Alternatively, the signal source may be configured to generate a chirp signal.

A chirp signal will reveal more information about the compatible device, which may assist in more accurately identifying the compatible device.

The means for detecting a change in the input impedance of the transmit antenna may comprise a quadrature receiver.

Alternatively, the means for detecting a change in the input impedance of the transmit antenna may comprise a scalar receiver and a level detector.

The means for detecting a change in the input impedance of the transmit antenna may be configured to detect a change in the real part of the input impedance of the antenna.

Additionally or alternatively, the means for detecting a change in the input impedance of the transmit antenna may be configured to detect a change in the imaginary part of the input impedance of the antenna.

The means for detecting a change in the input impedance of the transmit antenna may be configured to detect a change in input impedance at a frequency associated with a resonant frequency of a transmit section of the NFC apparatus.

The signal source may be configured to generate a first chirp signal in a first frequency range and a second chirp signal in a second frequency range.

According to a second aspect of the invention there is provided a method of detecting a near field communications device, the method comprising transmitting a signal generated by signal source using a transmit antenna and detecting a change in the input impedance of the transmit antenna.

The signal generated by the signal source may be at a constant frequency.

Alternatively, the signal may be a chirp signal.

A change in the input impedance of the transmit antenna may be detected using a quadrature receiver.

Alternatively, the change in the input impedance of the transmit antenna may be detected using a scalar receiver and a level detector.

Detecting a change in the input impedance of the transmit antenna may comprise detecting a change in the real part of the input impedance of the antenna.

Additionally or alternatively, detecting a change in the input impedance of the transmit antenna may comprise detecting a change in the imaginary part of the input impedance of the antenna.

Detecting a change in the input impedance of the transmit antenna may comprise detecting a change in input impedance at a frequency associated with a resonant frequency of a transmit section associated with the antenna.

A first chirp signal starting in a first frequency range and a second chirp signal in a second frequency range may be generated.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
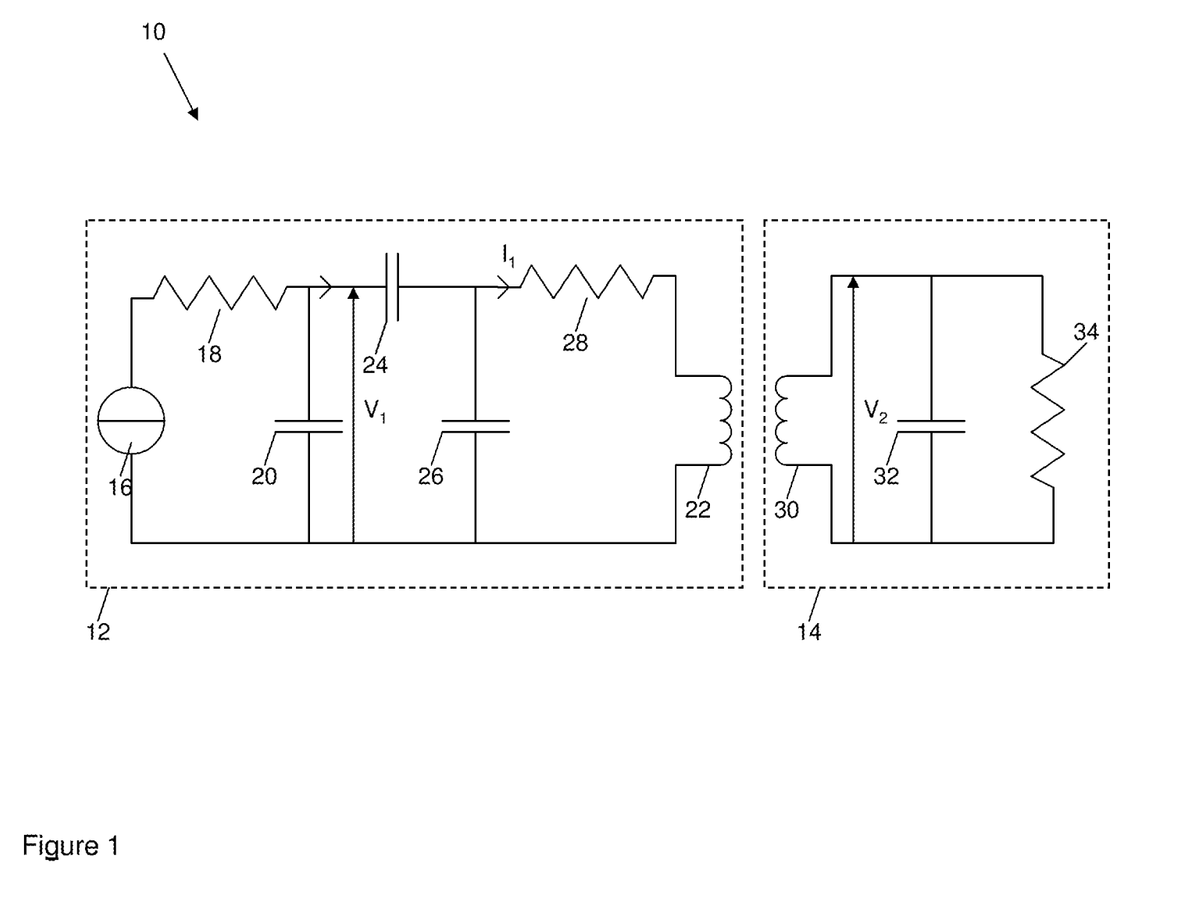
FIG. 1 is a schematic representation of a model of an NFC communication system.

Referring first to FIG. 1, a model of an NFC system is shown generally at 10, and includes a source section 12 representing an active (i.e. powered) NFC device such as an NFC reader and a load section 14 representing a passive (i.e. unpowered) NFC device such as an NFC tag.

The source section 12 includes a signal source 16 which is configured to generate a modulated or unmodulated signal, which typically has a frequency of around 13.56 MHz, although other frequency bands are also in use. The source 16 has an output resistance which is represented in FIG. 1 by a resistor 18, and a parasitic capacitance represented by a capacitor 20.

The source section 12 includes a transmit antenna 22 by means of which a signal generated by the source 12 is transmitted. The transmit antenna 22 is associated with capacitive components 24, 26, which affect the series resonant frequency of the source section 12. A resistance 28 sets the Q factor of the source section 12 when a load is applied via the load section 14.

In normal operation of the source section 12, a current $I_1$ flows through the transmit antenna 22, causing the transmit antenna 22 to generate a magnetic field, which couples the source section 12 to the load section 14 as described below.

In the model illustrated in FIG. 1 the load section 14 is shown as a passive device which harvests energy from the magnetic field generated by the transmit antenna 22 to generate a voltage and current for the load section 14.

An equivalent circuit for the load section 14 has a receive antenna 30 which is connected in parallel to a tuning capacitor 32 and to an equivalent resistive load 34. The receive antenna 30 is coupled to the transmit antenna 22 by the magnetic field generated by the transmit antenna 22 to generate a voltage $V_2$ across the receive antenna 30. When the strength of the magnetic field is low the voltage $V_2$ across the receive antenna 30 may not be high enough to activate the device. Thus, the equivalent resistive load 34 takes a high resistive value. In this case the load section 14 appears as a low loss device. At higher magnetic field strengths that permit energy harvesting by the load section 14 to activate the device, the load section 14 appears as a lossy device, as the equivalent resistive load 34 takes a low resistive value.

Figure 2:
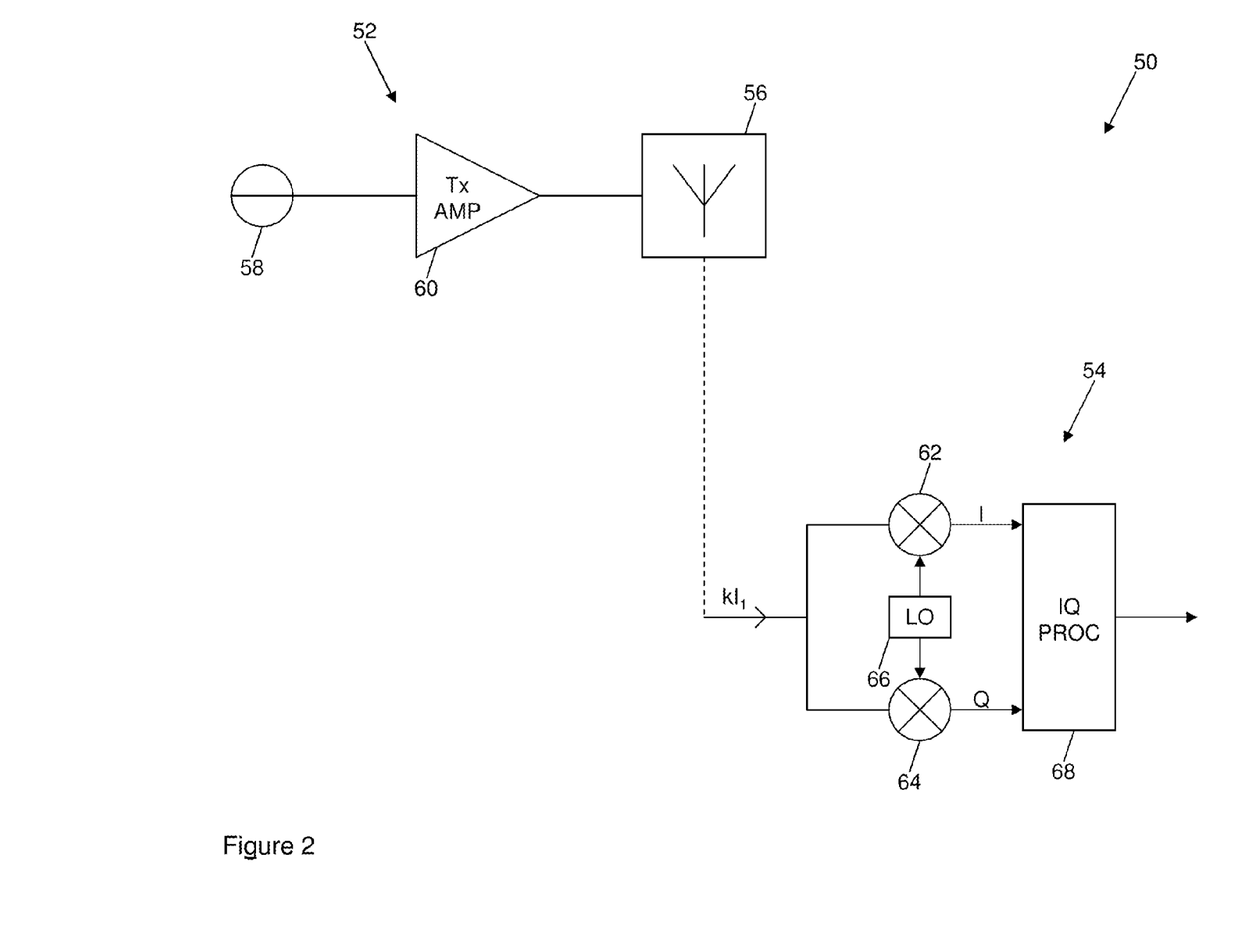
FIG. 2 is a schematic representation showing part of an architecture of an NFC device incorporating an NFC apparatus according to an embodiment of the present invention.

FIG. 2 is a schematic representation showing part of an architecture of an NFC device incorporating an NFC apparatus according to an embodiment of the present invention.

The NFC apparatus is shown generally at 50 in FIG. 2, and includes a transmit section 52 and a receive section 54, which are both connected to an antenna 56 which is operative both to transmit signals from the NFC apparatus 50 and to receive signals from devices external to the NFC apparatus 50.

The transmit section 52 includes a signal source 58 which generates a signal, which may be modulated or unmodulated, to be transmitted by the NFC apparatus 50. The signal source 58 incorporates the output resistance 18, the parasitic capacitance 20 and the capacitive components 24, 26 of the source section 12 shown in FIG. 1. An output of the signal source 58 is fed to an input of a transmit amplifier 60 which amplifies the signal generated by the signal source 58 before passing the amplified signal to the antenna 56 for transmission.

The receive section 54 in this example takes the form of a quadrature receiver having an input for receiving signals from the antenna 56. A received signal is passed to mixers 62, 64 which mix the received signal with in-phase and quadrature components of a signal generated by a local oscillator 66. The resulting signals are output by the mixers 62, 64 to a processor 68 which demodulates and decodes the received signal to retrieve usable data.

As the receive section 54 is connected to the dual-function (transmit/receive) antenna 56, the receive section 54 receives a current $kI_1$ which is proportional to the current in the antenna 56. Thus, the receive section 54 is able to monitor the current in the antenna 56 as an NFC device or other object is brought into range of the NFC apparatus 50 and from this deduce, by means of the processor 68, the effect that the NFC device or other object has on the input impedance of the antenna 56, and thus whether a compatible NFC device has come within range of the NFC apparatus 50, as is described below. If the processor 68 determines that a compatible NFC device has come within range of the NFC apparatus 50, the apparatus 50 can be switched to REM to allow a data transaction to take place between the NFC apparatus 50 and the compatible NFC device.

In one embodiment, the signal source 58 generates a signal with a constant frequency, for example 13.56 MHz. This signal is amplified by the transmit amplifier 60, and the amplified signal is transmitted by the antenna 56, generating a magnetic field around the antenna 56. When a compatible NFC device comes within range of the antenna 56, its antenna (e.g. the load antenna shown at 30 in FIG. 1) couples to the magnetic field generated by the transmit antenna 56, producing a voltage across the load in the compatible NFC device. With the compatible NFC device coupled in this way, components of the compatible NFC device affect the input impedance of the antenna 56 of the NFC apparatus 50, which causes a change in the current in the antenna 56. The change in the input impedance of the transmit antenna 56 can be detected and used by the processor 68 to determine whether a compatible NFC device has come within range of the NFC apparatus 50 and the type of compatible device. The processor 68 can then switch the NFC apparatus 50 into the reader emulation mode using a modulation scheme that is appropriate for the type of NFC device detected to allow a data transaction to take place between the NFC apparatus 50 and the detected NFC device.

Generally speaking compatible NFC devices can be classified as being either lossy or lossless. An example of a lossy device is a passive NFC device which harvests energy from the magnetic field generated by the antenna 56 to generate DC power. A lossless device might be an active (i.e. powered) NFC device which is able to function without harvesting energy from the magnetic field generated by the antenna 56. An alternative example of a lossless device is a passive NFC device where the strength of the magnetic field generated by the antenna 56 is too low to permit energy harvesting by the passive NFC device.

Figure 3:
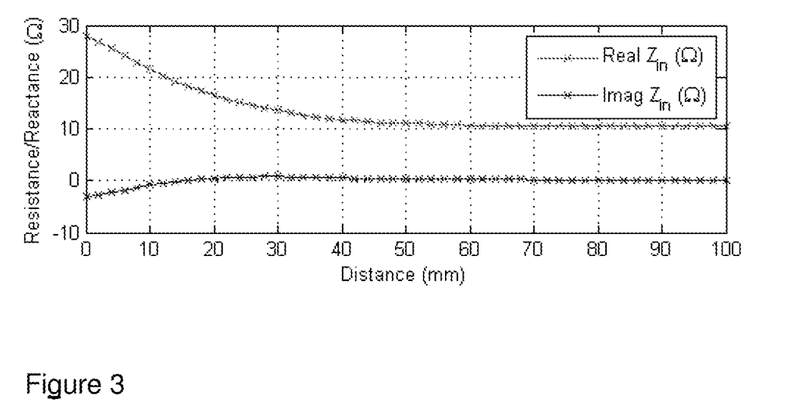
FIG. 3 is a graph showing the real and imaginary components of the input impedance an antenna of an NFC apparatus according to an embodiment of the present invention when a compatible lossy NFC device approaches the antenna.

FIG. 3 is a graph showing the change in the real and imaginary components of the input impedance (shown as $Z_{in}$ in FIG. 3) presented to the signal source 58 by the passive components (resistances 18, 28 and capacitances 20, 24, 26) and the antenna 56 of the transmit section 52 as the distance between a compatible lossy NFC device and the antenna 56 changes. In FIG. 3 the upper trace shows the real part of the input impedance (i.e. the resistance) of the antenna 56, whilst the lower trace shows the imaginary part of the input impedance (i.e. the reactance) of the antenna 56. It will be noted that as the distance between the compatible lossy NFC device and the antenna 56 decreases the real part (resistance) of the antenna 56 input impedance increases by a large amount, whilst the imaginary part (reactance) of the antenna 56 input impedance reduces by a small amount.

Thus, it is possible for the NFC apparatus 50 to detect the approach or presence of a compatible lossy NFC device by observing a large increase in the real part of the input impedance of the antenna 56.

The NFC apparatus is not able directly to measure the real and imaginary parts of the input impedance of the antenna 56. However, the quadrature receiver of the receive section 54 receives a signal which is proportional to the current in the antenna 56, and from this signal a change in the input impedance of the antenna 56 can be detected. In the case of a lossy NFC device approaching the antenna 56 of the NFC apparatus 50 the amplitude of the signal received by the quadrature receiver is reduced. This can be detected by the processor 68, thus allowing the processor 68 to deduce that a lossy NFC device is approaching or is present.

Figure 4:
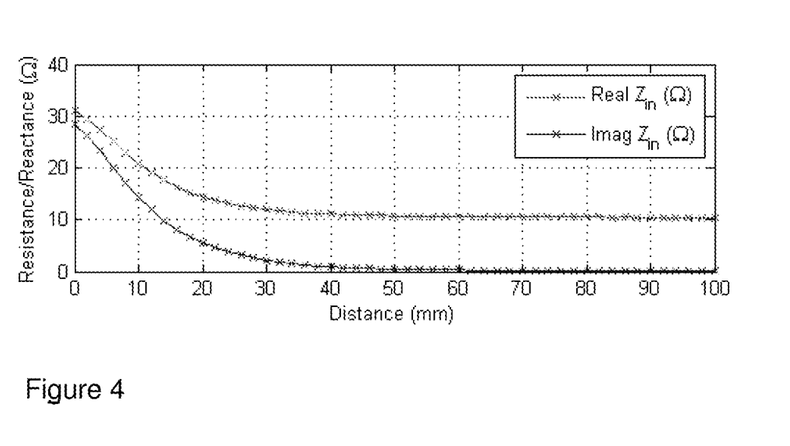
FIG. 4 is a graph showing the real and imaginary components of the input impedance an antenna of an NFC apparatus according to an embodiment of the present invention when a compatible lossless NFC device approaches the antenna.

FIG. 4 is a graph showing the change in the real and imaginary components of the input impedance (shown as $Z_{in}$ in FIG. 4) presented to the signal source 58 by the passive components (resistances 18, 28 and capacitances 20, 24, 26) and the antenna 56 of the transmit section 52 as the distance between a compatible lossless NFC device and the antenna 56 changes. In FIG. 4 the upper trace shows the real part of the input impedance (i.e. the resistance) of the antenna 56, whilst the lower trace shows the imaginary part of the input impedance (i.e. the reactance) of the antenna 56. It will be noted that as distance between the compatible lossless NFC device and the antenna 56 decreases the imaginary part (reactance) of the antenna 56 input impedance increases by a large amount in comparison to the increase exhibited by the real part (resistance) of the antenna 56 input impedance.

Thus, it is possible for the NFC apparatus 50 to detect the approach or presence of a compatible lossless NFC device by observing a large increase in the imaginary part of the input impedance of the antenna 56 in comparison to the increase observed in the real part of the input impedance of the antenna 56. As before, the quadrature receiver of the receive section 54 receives a signal which is proportional to the current in the antenna 56, and is able to detect from this signal a change in the input impedance of the antenna 56. In the case of a lossless NFC device approaching the antenna 56 of the NFC apparatus 50 the phase of the signal received by the quadrature receiver changes more rapidly and to a greater extent than the amplitude of that signal. This can be detected by the processor 68, allowing the processor 68 to deduce that a lossless NFC device is approaching or is present.

It will be appreciated that a threshold or other mechanism is required in order for the processor 68 to detect that the phase of the signal received by the quadrature receiver is changing more rapidly and to a greater extent than the amplitude of that signal. This can lead to inaccurate results, as the processor 68 may determine that a compatible lossless NFC device is approaching or is present when it is not, which could lead to unnecessary power consumption as the REM mode of operation is activated when no compatible NFC device is present. More importantly, if the processor 68 misinterprets changes in the amplitude or phase of the signal received by the quadrature receiver and fails to identify the approach or presence of a compatible NFC device the REM mode of operation will not be activated and no data transaction can take place.

In an alternative embodiment, instead of generating a signal at a constant frequency, the signal source 58 of the NFC apparatus 50 generates a "chirp" signal, i.e. a signal whose frequency increases from an initial frequency to a final frequency over a period of time. Using a chirp signal in this way allows the processor 68 more accurately to identify the approach or presence of a compatible NFC device, and the type of NFC device approaching or present. This is because the approach or presence of a compatible NFC device in the vicinity of the transmit antenna 56 may cause the input impedance of the antenna 56 to change. This change in the input impedance of the antenna 56 causes the series resonant frequency of the transmit section 52 associated with the antenna 56 to change.

The input impedance of the antenna 56 can be detected as described above as the frequency of the transmitted signal changes, for example by measuring the input impedance at discrete frequencies or frequency increments within the frequency range of the chirp signal transmitted by the NFC apparatus 50, and any change in the input impedance of the antenna 56 can be used to identify the type of tag that is present or is approaching the antenna 56.

Figure 5:
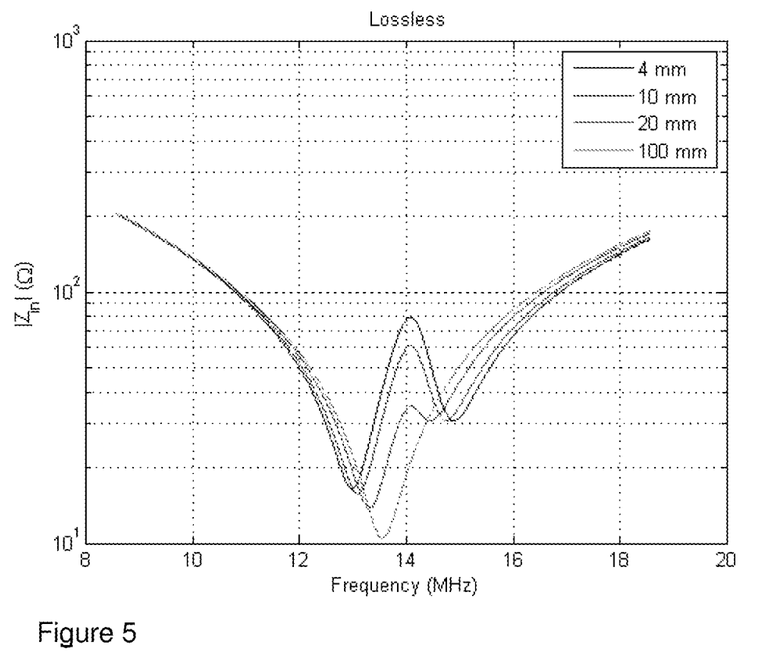
FIG. 5 is a graph showing the magnitude of the input impedance of an antenna of an NFC apparatus according to an embodiment of the invention against frequency, illustrating how the series resonant frequency of a transmit section of the NFC apparatus of an embodiment of the present invention changes as a lossless NFC device approaches the antenna.

This change in the input impedance of the antenna 56 with the changing frequency of the transmitted signal is illustrated, for a particular lossless NFC tag, in FIG. 5. Strictly speaking, FIG. 5 plots the magnitude of the impedance of the transmit section 52 (i.e. the impedance presented to the signal source 58 by the passive components such as resistances 18, 28, capacitances 20, 24, 26 and the antenna 56) of the NFC apparatus 50 against the frequency of the transmitted signal for four different distances between the antenna 56 and the tag. As can be seen, as the frequency of the transmitted signal changes the magnitude of the impedance of the transmit section 52 of the NFC apparatus also changes. This is true for all four of the plotted distances between the antenna 56 and the lossless tag.

As the values of the passive components such as the resistances 18, 28 and capacitances 20, 24, 26 are fixed, this change in the magnitude of the impedance of the transmit section 52 is due to a change in the impedance of the antenna 56. This change occurs with a minimal change in the input resistance of the antenna 56.

For the particular lossless NFC device to which FIG. 5 relates, a double trough in the magnitude of the impedance of the transmit section 52 appears as the distance between the tag and the antenna 56 is reduced. It will be noted from FIG. 5 that as the distance between the lossless NFC device and the antenna 56 decreases the second trough appears at a higher frequency than the first trough, becoming more pronounced as the distance between the lossless NFC device and the antenna 56 decreases. Thus, the particular tag to which FIG. 5 relates can be identified by the processor 68 of the NFC apparatus 50 by identifying the (relatively lower) frequency at which the first trough appears and the (relatively higher) frequency at which the second trough appears, for example. As this profile of input impedance against frequency is characteristic of the particular tag to which FIG. 5 relates, that particular tag can be identified by the processor 68 by recognising, from the identified frequencies at which the troughs appear.

It will be appreciated that the situation described above with reference to FIG. 5 is a specific example of a more general scenario in which the input impedance of the antenna 56 changes. Different types of NFC device may cause different changes in the input impedance of the antenna 56 as a function of frequency. If the impedance at 13.56 MHz is measured and during operation is found to change an NFC device such as a tag may be present. By comparing the change in impedance at many more frequencies a greater confidence can be obtained that a tag is present. In addition the impedance change versus frequency profile will be characteristic of certain types of tags enabling the NFC apparatus 50 to determine the most appropriate modulation format and to establish communications more quickly.

For example, a particular tag that has been detected by the NFC apparatus 50 can be identified (by general type or more specifically) by using the instantaneous frequency of the transmitted signal at a particular time and the detected input impedance at that instantaneous frequency as indices to a to a look-up table stored in a memory of the processor 68, or an external memory associated with the processor. The look-up table may be, for example, a two-dimensional table listing discrete frequencies within the frequency range of the chirp signal against input impedance values, with an NFC device type being associated with each of the frequency-impedance value pairs such that the type of NFC device can be retrieved from the look-up table by the processor 68.

In order to do this, the processor 68 must determine the series resonant frequency of the transmit section 52 when no NFC device is present or approaching. The signal source 52 generates a chirp signal to be transmitted via the antenna 56, and the processor 68 determines the frequency of the transmitted chirp signal at which the amplitude of the signal received by the quadrature receiver is at a minimum, corresponding to the frequency at which the real and imaginary parts respectively (i.e. the resistance and reactance respectively) of the input impedance of the antenna 56 are at a minimum. The processor 68 can then assess whether there has been a change in the series resonant frequency of the transmit section 52 without a large corresponding change in its resistance. If so, the processor 68 can deduce that a lossless NFC device is approaching or present.

It will be appreciated that in certain circumstances an object which is not a compatible NFC device may approach the antenna 56, for example when a mobile telephone incorporating the antenna 56 is placed on a metallic surface. It is important that the NFC apparatus 50 is able to recognise such circumstances, to avoid incorrectly determining that a compatible NFC device is approaching and switching to the power-intensive REM mode unnecessarily.

When a metallic object approaches the antenna 56, the reactance component of the input impedance of the antenna 56 decreases, while the resistance component of the input impedance of the antenna 56 remains fairly constant (although a very small decrease in the resistance component may be observed). If the quadrature receiver detects changes of this nature the processor 68 is able to deduce that no compatible NFC device is approaching, and thus REM mode is not entered.

In a further embodiment, the signal source 58 may be configured to generate two different chirp signals, a first signal in a lower frequency range than a second signal, to permit the processor 68 to determine the type of compatible NFC device that is approaching or present.

For example, when a passive NFC device is operating in an energy harvesting mode, the resonant frequency of the detected NFC device tunes to a lower frequency such as around 13.56 MHz. If a chirp signal in this relatively low frequency range is transmitted through the antenna 56 a change in the impedance of the antenna 56 at this low frequency range will be detected by the quadrature receiver and the processor 68 can thus deduce that an energy harvesting NFC device is approaching or is present.

When a compatible NFC device is not energy harvesting an additional resonance appears at a higher frequency, for example above 20 MHz. If a chirp signal in this higher frequency range is transmitted through the antenna 56, a change in the impedance of the antenna 56 at this higher frequency range will be detected by the quadrature receiver, and the processor 68 can thus deduce that a passive NFC device is approaching or is present and is not in an energy harvesting mode of operation.

Identification of different types of compatible NFC devices in this way is beneficial, as it can accelerate the completion of an NFC transaction. When a compatible NFC device is detected by a device such as an NFC reader the reader must transmit modulated signals using a large number of different modulation schemes, which may take several milliseconds for each different modulation scheme. It will be appreciated that this increases power consumption. By identifying the type of compatible NFC device detected, the number of different modulated signals that must be transmitted can be reduced, as an appropriate modulation scheme or group of modulation schemes can be selected based on the type of NFC device detected. Thus, the amount of time for which the reader must transmit signals can be reduced, thereby reducing power consumption.

It will be appreciated that in certain circumstances objects around the NFC apparatus 50 may interfere with or mask the effects associated with the approach of a compatible NFC device. It is important that the NFC apparatus is able to function correctly in these circumstances. Thus the processor 68 may be configured to operate on a differential basis, to deduce that a compatible NFC device is approaching or is present when the input impedance of the antenna deviates from a reference position or value, which reference position or value may be periodically updated to account for the position and orientation of the antenna 56 with respect to surrounding objects.

In the embodiments described above, considerably less current is required to detect the approach or presence of an NFC device, as the signal source 12 can periodically be switched on for a short period of time, i.e. the signal source 12 has a low operational duty cycle. When the signal source 12 is switched on, it requires less current to transmit either a constant frequency signal or one or more chirp signals than it does to operate the NFC apparatus 50 in REM mode. Additionally, as the current in the signal received by the quadrature receiver is proportional to the noise in the quadrature receiver, if the quadrature receiver is a low noise receiver, the current required to detect the approach or presence of a compatible NFC device can be further reduced. If a compatible NFC device is detected by the NFC apparatus it can then be switched into REM mode to complete an NFC transaction.

Although in the embodiments described above a quadrature receiver has been employed, it will be appreciated that alternative means could be used to deduce the presence or approach of a compatible NFC device. For example, a simple level detector could be used to detect changes in the amplitude of the signal which is proportional to the current in the antenna 56, and thus to detect changes in the resistance component of the input impedance. Alternatively, a scalar receiver could be employed in place of the quadrature receiver. In certain embodiments, a level detector may be used to detect changes in the resistance component of the antenna input impedance, and if such a change is detected a quadrature receiver could be activated to detect changes in the reactance component of the antenna input impedance.

The invention claimed is:

1. A near field communications (NFC) apparatus comprising:
    a transmit antenna;
    a signal source configured to generate a chirp signal which is transmitted using the transmit antenna, the chirp signal having a frequency that increases from an initial frequency to a final frequency over a period of time;
    a receive section coupled to the transmit antenna and configured to detect changes in an input impedance of the transmit antenna as the frequency of the chirp signal changes; and
    a processor configured to determine, based on the detected changes in the input impedance of the transmit antenna, whether a compatible NFC device is within an operating range of the NFC apparatus and whether the compatible NFC device is either a passive NFC device or an active NFC device;
    wherein the receive section is configured to detect a change in a real part or an imaginary part of the input impedance of the transmit antenna, and
    wherein the processor is configured to:
        identify the passive NFC device based on the detected change in the real part of the input impedance of the transmit antenna; or
        identify the active NFC device based on the detected change in the imaginary part of the input impedance of the transmit antenna.

2. The near field communications apparatus of claim 1, wherein the receive section comprises a quadrature receiver.

3. The near field communications apparatus of claim 1, wherein the receive section comprises a scalar receiver and a level detector.

4. The near field communications apparatus of claim 1, wherein the receive section is configured to measure the input impedance at a number of discrete frequencies within a frequency range associated with the chirp signal generated by the signal source.

5. The near field communications apparatus claim 1, wherein the signal source is configured to generate a first chirp signal in a first frequency range and a second chirp signal in a second frequency range.

6. A method of operating a near field communications (NFC) apparatus, the method comprising:
    transmitting a chirp signal generated by a signal source using a transmit antenna, the chirp signal having a frequency that increases from an initial frequency to a final frequency over a period of time;
    receiving, at a receive section of the NFC apparatus, a current that is proportional to a current in the transmit antenna;
    detecting changes in an input impedance of the transmit antenna as the frequency of the transmitted chirp signal changes, wherein the detecting comprises detecting a change in a real part or an imaginary part of the input impedance of the transmit antenna;
    determining, based on the detected changes in the input impedance of the transmit antenna, whether a compatible NFC device is within an operating range of the NFC apparatus and whether the compatible NFC device is a passive NFC device or an active NFC device; and
    identifying the passive NFC device based on the detected change in the real part of the input impedance of the transmit antenna, or identifying the active NFC device based on the detected change in the imaginary part of the input impedance of the transmit antenna.

7. The method of claim 6, wherein changes in the input impedance of the transmit antenna are detected using a quadrature receiver.

8. The method of claim 6, wherein changes in the input impedance of the transmit antenna are detected using a scalar receiver and a level detector.

9. The method of claim 6, wherein the detecting further comprises:
    measuring the input impedance at a number of discrete frequencies within a frequency range associated with the chirp signal generated by the signal source.

10. The method of claim 6, further comprising:
    generating a first chirp signal in a first frequency range; and
    generating a second chirp signal in a second frequency range.

11. The near field communications apparatus of claim 1, wherein:
    the receive section is configured to detect a change in both a real part of the input impedance and an imaginary part of the input impedance of the transmit antenna; and
    the processor is configured to identify the compatible NFC device as either a passive NFC device or an active NFC device based on the detected changes in real part of the input impedance and the imaginary part of the input impedance.

12. The near field communications apparatus of claim 11, wherein the processor is configured to identify the compatible NFC device as the passive NFC device based on a detected increase in the real part of the input impedance and a detected decrease in the imaginary part of the input impedance.

13. The near field communications apparatus of claim 11, wherein the processor is configured to identify the compatible NFC device as the active NFC device based on a detected decrease in the real part of the input impedance and a detected increase in the imaginary part of the input impedance.

14. The method of claim 6, further comprising:
    detecting a change in both a real part of the input impedance and an imaginary part of the input impedance of the transmit antenna; and
    identifying the compatible NFC device as either a passive NFC device or an active NFC device based on the detected changes in real part of the input impedance and the imaginary part of the input impedance.

15. The method of claim 14, wherein the compatible NFC device is identified as the passive NFC device based on a detected increase in the real part of the input impedance and a detected decrease in the imaginary part of the input impedance.

16. The method of claim 14, wherein the compatible NFC device is identified as the active NFC device based on a detected decrease in the real part of the input impedance and a detected increase in the imaginary part of the input impedance.

\* \* \* \* \*